United States Patent [19]
Mohn

[11] 3,754,812
[45] Aug. 28, 1973

[54] LIGHTWEIGHT OPTICAL ELEMENTS WITH HONEYCOMB SUPPORT PLATE

[75] Inventor: Heinrich Mohn, Hailer, Kreis Gelnhausen, Germany

[73] Assignee: Heraeus-Schott Quarzschmetze GmbH, Hanau, Germany

[22] Filed: Mar. 4, 1971

[21] Appl. No.: 153,799

Related U.S. Application Data

[63] Continuation-in-part of Ser. No. 491,525, Sept. 30, 1965, abandoned, Continuation-in-part of Ser. No. 630,147, Sept. 23, 1966, abandoned, Continuation of Ser. No. 825,087, March 20, 1969, abandoned.

[52] U.S. Cl. .................. 350/167, 161/68, 350/288, 350/310
[51] Int. Cl. ............................................. G02b 5/08
[58] Field of Search ................ 350/288, 292, 293, 350/310, 276, 245, 167, 319, 263, 265, 96, 205, 264; 161/68, 69, 109, 4

[56] References Cited
UNITED STATES PATENTS

| | | | |
|---|---|---|---|
| 719,065 | 1/1903 | Wadsworth | 350/263 |
| 1,532,002 | 3/1925 | Thomson | 350/296 UX |
| 2,067,843 | 1/1937 | Tonnies | 350/167 UX |
| 2,653,516 | 9/1953 | Johnson | 350/96 UX |
| 2,988,959 | 6/1961 | Pelkey et al. | 350/310 X |
| 3,134,021 | 5/1964 | Ploke | 350/205 X |
| 3,283,655 | 11/1966 | Rau | 161/68 |

FOREIGN PATENTS OR APPLICATIONS
968,025 8/1964 Great Britain ............ 350/288

*Primary Examiner*—David Schonberg
*Assistant Examiner*—Ronald J. Stern
*Attorney*—Burgess, Dinklage & Sprung

[57] ABSTRACT

A light weight optical assembly comprising an optical surface, such as a mirror or an optically transparent surface, which surface is in the form of a plate and is supported by and fused to a fused silica perforated support structure, which support structure comprises walls extending longitudinally transverse to the major surfaces of the optical plate wherein the optical plate is fused to the walls at the interface of the ends of the walls and the rear surface of the optical plate, especially a device having a supporting structure whose perforations are of a diameter between 40 and 80 mm, which perforations are substantially uniformly distributed throughout its area, all extending generally axially parallel to each other, especially a support structure comprising large and small perforations with said small perforations having a smaller diameter, at least at the outer edge of the supporting structure.

6 Claims, 7 Drawing Figures

Patented Aug. 28, 1973
3,754,812
2 Sheets-Sheet 1
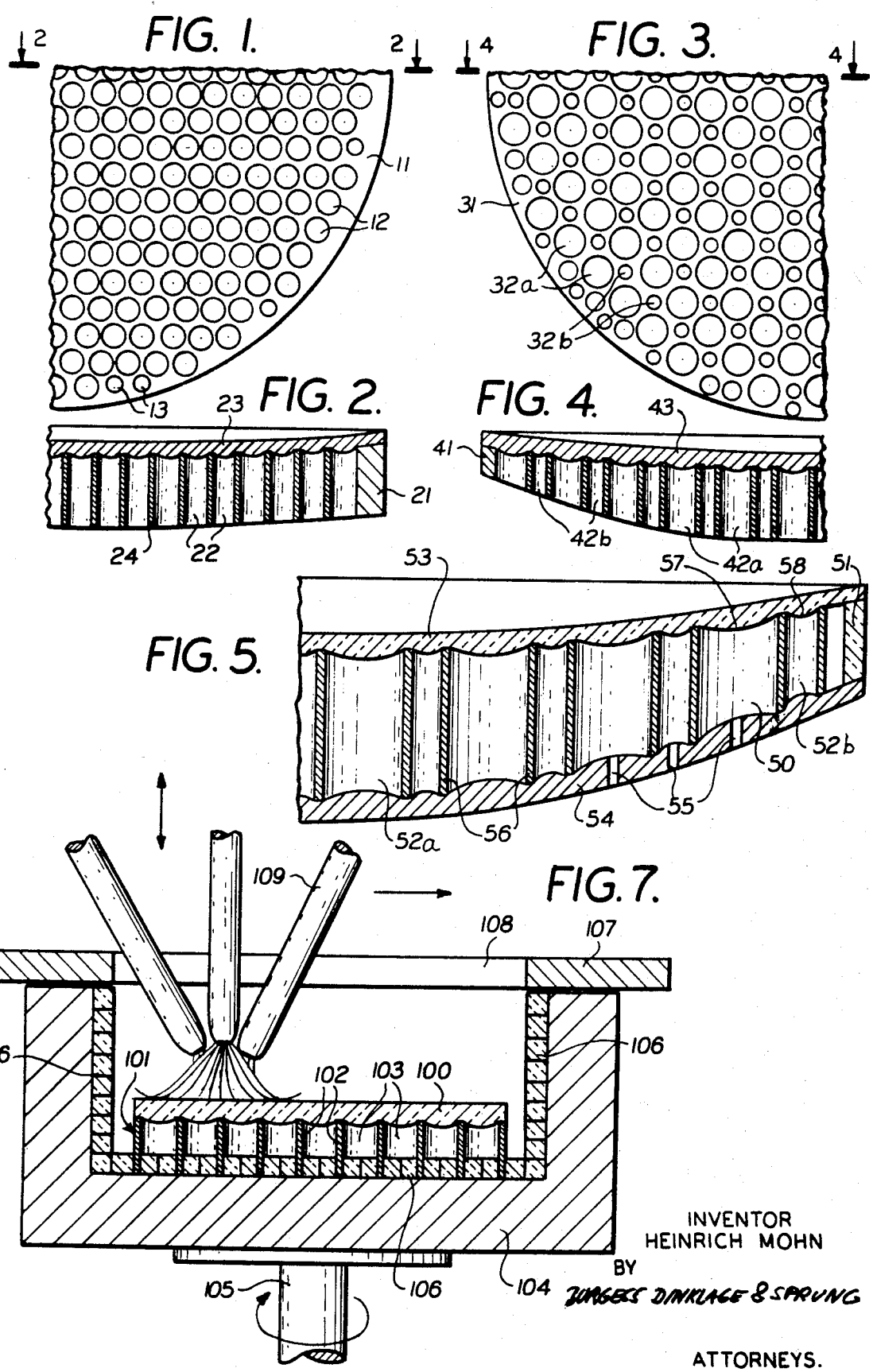

LIGHTWEIGHT OPTICAL ELEMENTS WITH HONEYCOMB SUPPORT PLATE

This application is a continuation in part of applications, Ser. Nos. 491,525 and 630,147, filed Sept. 30, 1965 and Sept. 23, 1966 respectively, both now abandoned, the contents of which applications are incorporated herein by reference. This application is a continuation of Ser. No. 825,087, filed Mar. 20, 1969, now abandoned.

This invention relates to optical structures, such as mirrors and windows. It more particularly refers to such optical structures having an optical plate surface in combination with a perforated support structure. It further refers to a particular method of making such structures.

Optical mirrors generally used for parallel, focusing or diffusing reflection of light rays directed thereagainst are well known. Many materials have been used for mirror construction, all of which are well known in the art. Quartz glass has proved to be a particularly advantageous material from which to manufacture highly accurate mirrors. Such quartz glass mirrors have been made both out of a solid block of optical quartz and out of a relatively thin layer of optical quartz bonded or fused onto a much larger, relatively massive block of relatively lowcost opaque quartz material.

In the case of sensitive instruments utilizing highly accurate mirrors, temperature variations and mechanical effects such as stress are capable of causing distortion and result in inaccuracies in the reflecting surface thus rendering precise measurements with such distorted mirror impossible. It has not been uncommon for the mirror polishing or mounting operation to impart imperfections into the reflecting surface.

In the past, a great deal of effort has gone into improvements in mirror construction and preparation in order to reduce the possibility of mirror surface imperfection or inaccuracy. Included in this work have been efforts directed toward stabilizing the mirror against stresses and strains imparted through temperature differential in different parts of the mirror surface. Further effort has gone into making optical instrument mirrors structurally stable regardless of the angle of the mirror with respect to a given reference plane.

One known method of producing a lightweight quartz mirror has been to join an optical quartz glass mirror plate with a quartz glass base plate through quartz tubes by fusion of each of the mirror plate and base plate to opposite ends of the tubes. These mirrors have proved to be valuable but not always sufficiently rigid to withstand tilting of the mirror with no resultant inaccuracy. In fact, this type of mirror construction, in a one (1) meter diameter reflector, has shown a knife edge deviation, as between horizontal and tilt at an angle from the horizontal, of as much as about one (1) millimicron when tested by Foucault's method.

An additional disadvantage of prior lightweight and "solid" mirror constructions has been the inability to test such mirrors for defects via polarized light, because of the opacity of the base quartz glass plate.

In the testing of devices intended to be used in space, such as for example, capsules and instrument packages, it has often been the practice to utilize simulation chambers in which ground level testing can be accomplished under simulated space conditions. These chambers can simulate the very high vacuum of space and in addition, it has been sought to simulate the radiation conditions of space in these chambers.

The usual space simulation chambers have sealed windows of various dimensions made of a substance that is resistant to temperature and pressure, and which must be able to pass radiation substantially similar to the solar spectrum. Radiation comparable to the solar spectrum is usually produced by xenon high pressure and very high pressure lamps disposed outside of the simulation chamber, and contains, in addition to visible light, considerable percentages of short-wavelength ultraviolet rays and long-wavelength infrared rays. At the same time, it is important that the emission of these lamps be radiated into the chambers with the lowest possible loss.

In many cases, the light irradiated through relatively small quartz glass windows has been uniformly distributed within the simulation chamber by reflection, especially onto the object being tested. For this purpose, windows of small dimensions have been found to be substantially adequate; however, considerable light losses are incurred, particularly due to multiple reflection, and these losses could be avoided by direct irradiation through a larger window providing the inherent absorption of the windows could be kept small, especially in the ultraviolet and infrared region.

Quartz glass is generally used as the material for the sealed windows on account of the good optical qualities which it has for this application. In order to get as much radiation as possible into the chamber, correspondingly large irradiation orifices and hence large windows must be used. As a result, however, the larger the admittance orifice is, the greater the thickness of the sealed window must be on account of the simultaneously larger stress on it. For example, for a window with a clear opening of about 500 mm, a quartz glass plate with a thickness of about 50 mm is necessary, while in the case of a sealed window with a clear opening of 900 to 1,000 mm, the quartz glass plate would have to be 70 to 80 mm thick in order to satisfy structural requirements. Such thicknesses have generally been avoided hitherto, and instead small windows have been used and the radiation has been distributed on the object in the interior of the chamber by reflection.

Not only have the high costs of large quartz glass plates of about 500 to 1,000 mm diameter restricted their use, but the disadvantages which accompany increased plate thickness, including the considerable absorption both of ultraviolet rays and of the infrared rays, tend to discourage their use. The high costs could indeed be reduced by the use of quartz glass of medium quality, but in these types of quartz glass the radiation absorption is still greater when plate thicknesses of 50 to 80 mm are used. Previously, therefore, a compromise has often been made between using small windows with a diameter of 100 to 150 mm and a plate thickness of about 5 to 10 mm which, due to the necessary plurality of the windows presented the additional disadvantage of numerous seals and shadow areas, and using large windows with correspondingly greater plate thickness and correspondingly great absorption of the radiation.

With all types of quartz glass, it is apparent, and it is shown by the above-mentioned graphs, that in the case of quartz glass plates of slight thickness of, for example, 4 mm, the absorption of radiation that occurs both in the ultraviolet and in the infrared range is particularly negligible. The use of thin quartz glass plates for the optical windows of simulation chambers would thus be desirable if they did not entail the above-mentioned disadvantages of numerous seals and shadow areas as in the case of the small windows of the sizes that have hitherto been possible.

In the recent past there have been developed newer mirror and window constructions having optical elements of quartz glass which would seem to obviate many if not all of these problems and would seem to be ideally suited to the uses referred to above. In particular reference is made to British pat. 968,025, published Aug. 26, 1964, wherein there is disclosed an optical mirror construction utilizing a quartz glass optical surface and a fused silica, quartz glass, ceramic or other similar support structure. The support structure is stated to be a tubular supporting means which is welded to the optical plate and to a base plate. Further, this British patent goes on to note that the support member may be a mass of the desired material, e.g. fused silica, which has been cast or drilled in such manner as to provide the equivalent of a tubular support structure as referred to in this patent.

As will be noted from the above discussion, it is desirable to make an optical device of the type described herein as light as possible and as transparent to impinged radiation as possible consistant with the structural strength requirement of the assembly. Therefore it is desirable to make the cellular support structure of as little mass as possible, particularly of as little mass transverse to the impinged radiation as possible. This can be accomplished by utilizing a support structure which is a fused silica member having transverse perforations therein, that is transverse with respect to the optical surface dimension of the assembly. Put another way, in an optical window assembly, the perforations permit the passage of radiation through the window and thence through the support structure through the perforations. In the interest of maximum lightness and maximum transmittance, it is desirable to utilize perforations with the largest effective diameters and therefore to utilize perforated support structures with the smallest effective wall thicknesses between perforation.

Optical assemblies of the type to which this invention is directed, are usually assembled by fusing the various members together. In the past, this fusing or welding has been accomplished with substantially any heat source available, such as a furnace, by simply heating the assembly, in a suitable jig if desired, for a time sufficient to fuse the members of the assembly together.

It has now been discovered that where a perforated supporting structure with relatively thin walls is used, prior art heating techniques are not always satisfactory. It has been discovered that furnace heating of the optical device assembly described herein, having a relatively thin walled perforated supporting structure, often causes distortion and buckling of the thin walls of the supporting structure where such heating is for a sufficient time to accomplish fusion of the optical plate to the supporting structure.

It is therefore an object of this invention to provide an improved method of making optical device assemblies.

It is another object of this invention to provide an improved method of assembling an optical plate to a thin walled perforated support structure therefor.

It is a further object of this invention to provide an improved lightweight optical device.

Other and additional objects of this invention will become apparent from a consideration of this entire specification including the claims and drawing hereof.

It should be noted that the perforated support structure is a plate of fused silica or the like which has been cast to produce perforations therein or which has been cast or otherwise formed as a solid mass and then has the suitably sized perforations drilled thereinto. The perforations, whether drilled or cast into the support structure, may pass all the way through the structure, or may be blind holes bored or cast only partially through the support structure.

In accord with and fulfilling the above objects, one aspect of the instant invention resides in a new special method of making lightweight optical devices. The practice of the method of this invention produces a rather special form of product which significantly differs from prior art constructions of the same general type.

According to the method of this invention, an optical device assembly is produced by placing an optical quartz glass plate, suitably a mirror or a window, on a perforated support structure with the rear surface of the optical plate abutting a perforated surface of the support structure transverse to the perforations and covering such perforations. This assembly is then subjected to a high intensity, high temperature radiant heat source through the optical plate. By using a high intensity, high temperature radiant heat source, instead of the furnace heating of the prior art, it has been found that the heat accumulates at the interface of the walls of the perforated support structure of the optical plate and causes fusion of these two members at this interface in much shorter period of time than was needed to accomplish fusion at this interface with lower temperature convection heating such as with the furnace heating of the prior art. This accumulation of heat energy at the support structure walls-optical plate interface causes fusion at this interface before the remainder of the support structure walls have sufficient time to become warped or distorted by reason of the heat energy input. Thus it is possible and practical to make the perforations in the support structure of even larger cross sectional area than has been possible in the past, and similarly it is possible and practical to provide even thinner walls between perforations in the support structure than has been possible with prior art manufacturing methods without diminishing the strength and structural and optical integrity of the produced assembly.

A further unexpected attribute of carrying out the method described herein is the fact that, during fusion of the optical plate to the abutting walls of the support structure under the action of high intensity, high temperature radiant heat, that portion of the rear face of the optical plate which bridges the perforations tends to flow slightly into the perforations causing a convex depression of the rear of the optical plate into the mouth of each perforation. This convex depression greatly increases the strength of the entire structure without impairing its optical properties.

Understanding of this invention will be facilitated by the drawing in which:

FIG. 1 is a plane view of a portion of a support member for use in this invention;

FIG. 2 is an elevation in section taken along the line 2—2 in FIG. 1, with optical glass mounted on the support member, looking in the direction of the arrows;

FIG. 3 is similar to FIG. 1, showing another embodiment of this invention;

FIG. 4 is similar to FIG. 2, but the view is along the line 4—4 in FIG. 3;

FIG. 5 is similar to FIG. 4, showing still another embodiment of this invention;

FIG. 7 is an elevation, partially in section of apparatus for practicing the method of this invention.

Figure 6:
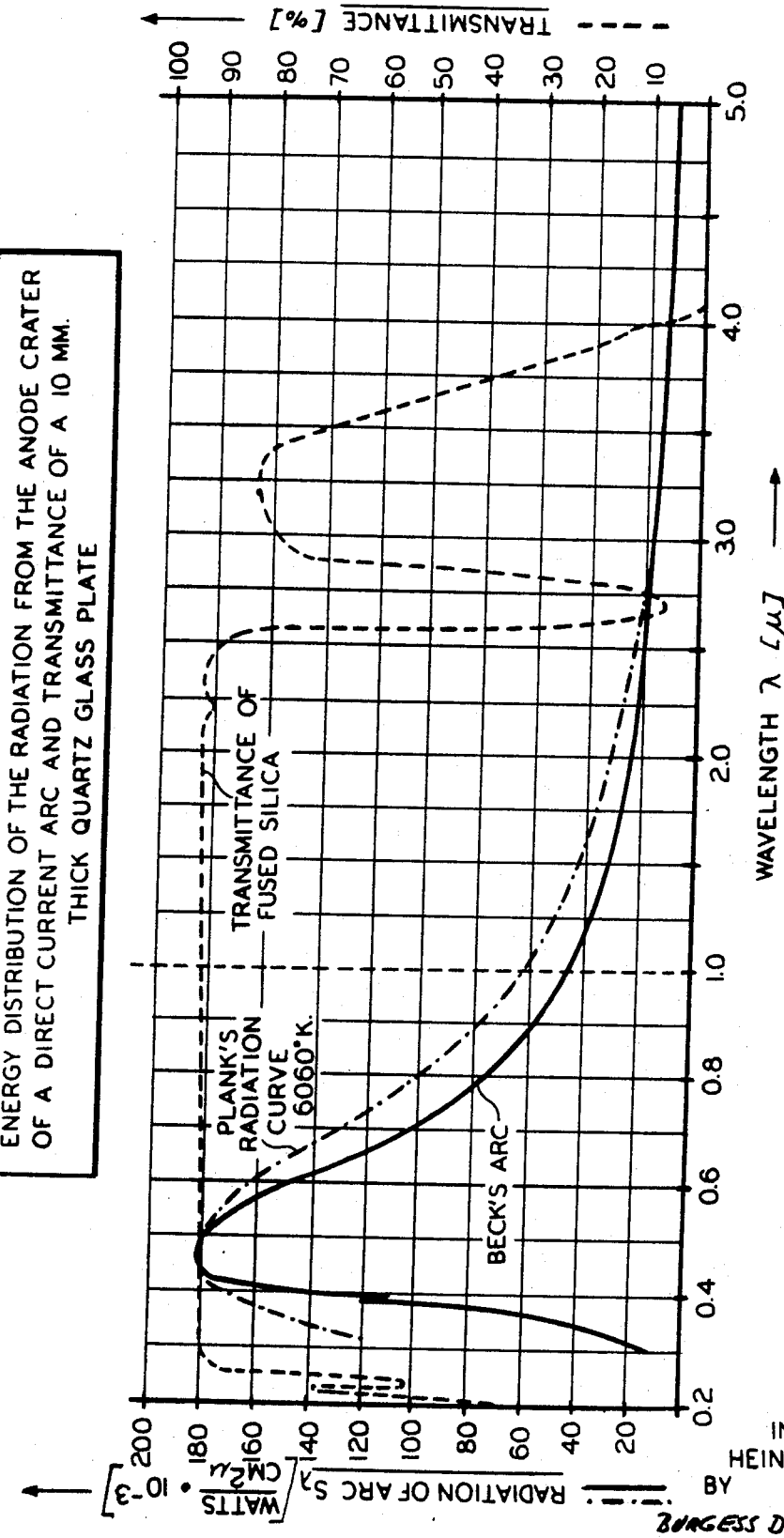
FIG. 6 is a set of graphs showing the energy distribution of radiation from the anode crater of a d.c. arc and the energy transmittance of a 10 mm thick quartz glass plate.

Referring to the drawing, and particularly to FIG. 7 thereof, there is seen a quartz glass optical plate 100 placed on a supporting structure 101 having walls 102 and perforations 103 therethrough. This assembly is positioned in a furance means 104, which is preferably rotatable about an axial shaft 105, lined with a suitable refractory material 106. This refractory material may be substantially any composition capable of resistance to the high temperature radiant energy of the method such as for example aluminum oxide, aluminum silicate, silica, Mulital, etc. A suitable covering 107 of approximate refractory material having one or more suitably sized and shaped openings 108 therein is disposed across the mouth of the furance 104. A high energy, high temperature radiant heat source 109, shown in this Figure as carbon arc generating electrodes, is disposed adjacent to and spaced from the optical plate (electrical connections for the carbon arc electrodes are not shown since they are conventional). Conventional means (not shown) are provided for moving the carbon arc electrodes assembly both vertically and horizontally. Similarly, conventional means (not shown) are provided for rotating the furnace during the fusing-process.

The method of this invention has been described as requiring high energy, high temperature radiant heat directed against the assembly to fuse the interface of the support structure walls to the abutting portions of the optical plate. It is known that quartz glass softens at temperatures above about 1,500°C. in order to obtain a good interface fusion seal, it is necessary that members be brought to at least such fusion temperature at the interface. However, the temperature of the remainder of at least the support structure should be maintained sufficiently low to avoid heat distortion and warping. It has been found, according to this invention, that this can be accomplished and that the optical plate can be fused to the cellular perforated support structure without significant heat distortion and warping of the assembly or any part thereof if there is used a high temperature, high energy radiant heat source. In fact, it is desirable to make the energy and temperature of the radiant heat source as high as possible.

The sealing together of optical plate and the supporting system takes place indirectly insofar as the heat radiation is transmitted by the quartz glass optical plate, which is to be sealed, and heats the interfacial area to such a high temperature that it melts. The higher the temperature of the source of radiation, and therefore the higher the amount of energy fed to the point of sealing, the shorter, more intensively and more dependably is the fused connection produced.

It has now been found that for the carrying out of this method, the sources of heat customarily used in glass technology such as gas flames of different temperatures or electric resistances cannot be successively employed, but rather sources of heat of temperatures up to at least about 4,000°C and higher must be used. High-current carbon arcs and/or plasma jets have proven suitable.

These sources of energy, particularly high-current carbon arcs, have temperatures which approach about 6,000° K; temperatures of 7,000°K and higher have been measured on contracted high-current columns with loads of 200 amp and higher and gradients of about 2,000 W/cm. (See Finkelnburg, Naturwissenschaften 32 (1944), 105 Physics of High Temperatures, Particularly of the High-Current Carbon Arcs.) There are produced at the arc anode of the so-called Beck arc, whose shape is particularly suitable, at a distance of about 1 mm from the front surface of the anode, temperatures of about 8,000° K.

It has been found suitable to use radiant energy in this invention of a wave length of about 0,2 to 10 microns, preferably in the range of 0,2 to 5 microns.

Certainly, average radiation temperatures of 5,000° to 6,000° C can be depended upon from such sources. Thus carbon arc electrode heat sources are excellent for the purposes of this invention because the radiation transmitted thereby passes through quartz glass without any appreciable absorption (see FIG. 6). This transmitted energy is accumulated at the interface and selectively heats such. In this regard, it should be noted that it is preferred to provide the edges of the support structure walls which abut the optical plate in a condition so as to enable them to absorb the high energy radiant heat more efficiently and effectively.

This can be accomplished by rendering such more receptive to the accumulation of heat energy in the surface portion. It is known in the art that roughened or dulled surfaces tend to accumulate energy and that bright and/or smooth surfaces tend to reflect and/or transmit such radiant energy. It is therefore desirable to in one or more ways make the interface surfaces, or at least one of them, more receptive to energy accumulation. This can be accomplished in known manner by roughening, grinding, etching, pigmenting, etc.

This is to be compared with convection heating by means of conventional gas flames of oxygen and hydrogen and/or oxygen and a hydrocarbon, such as acetylene which generate temperatures on the order of 2,200° to 2,500°C and thereby necessitate long heating times to fuse the optical plate to the supporting structure.

Referring to FIG. 6 it is seen that the emission curve of an arc crater compares with the Planck radiation curve for the same temperature of about 6,000°C. The transmittance of a 10 mm thick quartz glass plate is also plotted, from which it can be noted that the arc radiation can pass to a greater extent through the quartz glass plate. The radiation of a 5,000° black body above 3,8 $\mu$, which is not transmitted by the quartz glass plate, serves for the heating thereof. Due to the brief heating and fusing process, the portion of radiation passing through the plate is substantially greater than the part absorbed by the plate. The sealing effect is considerably increased when the supporting frame consists of opaque quartz glass, since the accumulation, particularly in the case of larger mirrors above a diameter of 70 cm and more, requires somewhat longer times and there is a higher accumulation of heat than in the case of a transparent supporting body.

In the case of a transparent supporting structure, the shock-like fusing together according to this invention is enhanced by grinding of the supporting structure wall edges and the frosting, by grinding, of the optical plate which is to be applied.

Beck carbon arcs have proved to be quite suitable for the carrying out of this process, i.e. ones in which anode and cathode were arranged at a smaller angle to each other. These arcs furthermore have the advantage that a considerable electrodynamic blowing effect is produced whereby cathode and anode flames are driven against the material to be heated, whereby also only a slight part of the energy is transmitted by convection. The arc power applied in each case depends upon the size of the object to be melted. In the case of optical plates of a diameter of up to about 500 mm. l.g. arcs of up to 200 V and with a total power of about 200 kws have proved favorable. The material to be melted is placed in a radiation-impeding rotary furnace and can be preheated by gas flames or else by electric energy if desired.

Surprisingly, with a heating arrangement as shown herein, very thin-walled supporting structures whose wall thickness is small as 2 mm and which also consist of quartz glass optical plates can be shock-heated at the interface fusion point without any noticeable deformations in the supporting framework occurring, with the exception of a few millimeters depth at the point of melting. The warping of the optical plate to be sealed on is also extremely small after the fusion process. As already mentioned, the formation of convex depressions which occurs upon the heating is a desirable effect which acts towards increasing the stability with relative descrease in weight.

The convex depression produced over and into each perforation represents a closure plate of the same flexural strength. Considered in profile, the cross-section of such a convex depression can be considered as a flexure parabola of the same strength, with the profile corresponding to a bending-moment parabola. At the point of cross-section of the convex-depression at the middle and at the edge of the stress is according to the formula:

$$\delta_0 = [3(3+\nu)]/8 \cdot (p \cdot r^2)/h^2$$

and for $$\delta_{ta} = (2 p r^2)/(8h^2) \cdot (2 - 2\nu) = [3(1-\nu)]/4 \cdot (p r^2)/h^2$$

$\delta_0$ = maximum stress in the center of the lens
$\delta_{ta}$ = edge stress
$\nu$ = Poisson's number
$h$ = thickness of the convex depression in the center
$p$ = pressure, in this case the entire weight itself of the convex depression
$r$ = radius In this case, if one enters the Poisson's number for quartz glass (a value of 0.17) and if one takes a maximum lens thickness of 12 mm with an inside diameter of the bore of 40 mm, then there results under the action of the weight:

for $\delta_0$ — 0.124 kg/cm$^2$
for $\delta_{ta}$ — 0.0656 kg/cm$^2$.

The values show that the center stress is about twice as great as at the edge, so that the edge could be weakened to 6 mm. For technological reasons, there results in the present case an arching of 6 mm, so that at the edge the thickness of the material is at least still 6 mm.

The moments of inertia of convex depression closures in total cell profiles with a height of about 100 mm, as compared with a flat plate of the same maximum thickness of about 12 mm with an inside diameter of 40 mm, are in the ratio of 180 cm$^4$/166 cm$^4$. The bending strength is only about 8 percent less than that of the solid plate, with a saving in weight of 20 percent.

It has been found that this lenticular convex curvature for a core of 40 mm generally has a radius of curvature of about 3 to 6 cm, preferably about 4 to 5 cm.

Practical tests have shown that a light-weight mirror made according to this invention could be loaded with an additional weight of 68 percent of the weight of the mirror. As compared with a solid mirror of the same stiffness, the weights were 20.7 kg and 43.3 kg respectively. Therefore, with the same output and same stiffness, the light-weight mirror thus results in a saving in weight of about 50 percent. The thickness of the light-weight mirror was about 7 percent greater than that of the solid mirror.

The optical device assembly according to this invention may suitably have a backing plate fused to the surface of the supporting structure opposite to the surface fused to the optical plate. Where such backing plate is provided, it is preferably fused to the supporting structure across the perforation in the same manner as the optical plate using the same or simular high energy, high intensity radiant heat. This causes localized fusion of the supporting structure wall ends and the backing plate, as in the fusion of the optical plate, without significant heating of the remainder of the supporting structure. Again, similar to the fusion of the optical plate to the supporting structure, fusion of the backing plate to the supporting structure in the manner of this invention causes convex depressions to form in the positions of the backing plate covering the supporting structure perforations. This further increases the structural integrity of the assembly.

It is preferred to provide apertures in the backing plate communicating with the perforations in the supporting structure. These apertures are preferably drilled after the backing plate has been fused to the supporting structure, but may be in the backing plate before such is fused to the supporting structure.

According to one embodiment of this invention, the optical device produced hereby may be a mirror, in which case the support structure and/or base plate may be opaque. This embodiment will be described with reference to the drawing, and particularly, FIG. 1 thereof. An opaque supporting structure 11 is shown having large and relatively uniform diameter holes 12 cut therein. Along the outer edge of the supporting structure 11 may be smaller diameter holes (perforations) 13 as the area of the supporting structure will allow. FIG. 2 shows the supporting structure in section with an end wall 21 and holes 22 shown as having relatively uniform diameter with a web 24 (that is walls) of supporting material remaining. In FIG. 2, an optical mirror 23 is shown. The convex depressions 10 shoud be noted.

Referring now to FIGS. 3 and 4, a modification of the mirror construction of FIG. 1 and 2 is shown, with FIG. 3 showing the supporting structure 31 having large diameter holes 32a therein and smaller holes 32b in the wall web between the larger holes. In FIG. 4, the supporting structure of FIG. 3 is shown in section with an end wall 41 and large holes (perforations) 42a and small holes (perforations) 42b together with an optical mirror plate 43 which may be silvered in the conventional manner mounted thereon. The convex depressions 10 should be noted.

Referring now to FIG. 5, a further modified mirror construction is shown similar to FIGS. 3 and 4 with a supporting structure 50 having an end wall and large holes (perforations) 52a and small holes (perforations) 52b therein and an optical mirror 53 mounted thereon. The shown construction has, in addition to the assembly shown in FIGS. 3 and 4, and additional back plate 54 which still further increases the rigidity of the structure. In this view, the additional back plate 54 has small holes (perforations) 55 therein for "breathing" purposes and small slots or communication apertures 56 provided in the web to permit free air or other media to flow between the holes thus preventing temperature differentials from building up. Note should be taken of the convex depressions 57 and 58 depending from the mirror and from the back plate respectively in the holes 52a and 52b.

In accordance with the practice of this invention, the weight of a given size optical mirror is reduced in weight up to about 60 to 65 percent over the weight of an equivalent size "solid" mirror while substantially retaining the rigidity and accuracy of a "solid" mirror.

One great advantage of the mirror construction of this invention, in particular that construction shown in FIGS. 1–4, is the fact that the mirror can be tested for flaws with polarized light from both sides thereof.

The diameter of the holes of the construction of the type shown in FIGS. 1 and 2 should be between about 10 and 55 mm, while retaining a web of at least about 2 to 3 mm in thickness at its thinnest point. When small holes intermediate the large holes are provided, as per FIGS. 3 and 4, the diameter thereof should be sufficiently small so as not to adversely affect the dimensional and part-relational stability and integrity. For example, the following table shows various relative hole and web sizes of the embodiment shown in FIGS. 3 and 4:

|   | Diameter of the large opening in mm. | Diameter of the small opening in mm. | Smallest remaining wall thickness in mm. | Greatest wall thickness in millimeters |
|---|---|---|---|---|
| I | 40 | 15 | 2.5 | 4.0 |
| II | 50 | 15–20 | 3.0 | 4.0 |
| III | 60 | 15–22 | 3.0–3.5 | 4.5–5.0 |
| IV | 70 | 20–25 | 3.5–4.0 | 5.0 |
| V | 80 | 22–28 | 4.0–4.5 | 6.0 |

In any case, it is desirable for the holes' cross-section to constitute a major portion of the surface area of the plate containing them.

Upon bonding of the optical mirror to the perforated base plate by fusion, the glass of the mirror flows into the holes or perforations to a minor extent forming a convex glass coating over the hole surface. This has been surprisingly found to increase the strength of the total structure and is therefore desirable.

While quartz is the preferred material of construction of the mirrors of this invention, other materials may be used such a polycrystalline alumina, and other known optical glass materials.

While the shape of the holes has heretofore been indicated to be circular, this is by no means imperative. These holes or perforations may be of any desired cross-section, e.g., elliptical, square, hexagonal, triangular, irregular, etc.

The following Example is given by way of illustration and is not limiting on the scope of this invention.

A one-meter diameter circular mirror of optical quartz was mounted on and fused to an opaque quartz supporting structure having a structure such as shown in FIGS. 3 and 4. The large circular holes had a 60 mm diameter, while the small circular holes had a 20 mm diameter. The web thickness varied from 3 to 5 mm, depending upon the hole proximity.

According to another embodiment of this invention, the optical device made according to the method disclosed herein may be a window or other light-transmitting body. In this embodiment, the supporting structure may be transparent or translucent. The construction of this embodiment is substantially the same as that described above with respect to the mirror embodiment of this invention, with the exception that the mirror 23 (in FIG. 2) or 43 (in FIG. 4) is a substantially transparent member rather than a reflective member.

The embodiment of this invention affords important improvements and a very considerable technical advance in the art. It has surprisingly developed that the above-described disadvantages associated with prior-art window constructions can be avoided and plates of large diameter and small plate thickness can be used if the window has a supporting structure cell system to which the relatively thin plate of quartz glass is bonded.

The new optical window is suitable for use in vacuum tanks, pressure tanks and simulation chambers and comprises, for example, a plate of natural or synthetic quartz glass in a thickness that provokes little or no absorption in the ultraviolet and infrared ranges of a radiation simulating the solar spectrum, and of a supporting system bonded to this plate.

The supporting structure system consists of a preferably translucent quartz glass plate, which is provided with holes of equal and/or different diameter. It is expedient, especially with a view toward a maximum transmittance through the optical window to provide additional holes in the points or areas of intersection of the holes of equal diameter, and in this way further to reduce the remaining bearing elements of the supporting system.

It has proved expedient to bore the holes in the supporting plate in a staggered arrangement, so that the area of intersection will have only three ribs instead of four. The intersection point will consequently have a smaller mass in which it will only be necessary to provide relatively small holes therein. In general, however, this can be dispensed with in the case of holes of up to about 60 mm; in the case of larger holes, the hole diameters then amount to between 9 and 14 mm.

In order to exclude certain wavelengths or bands or the radiation, eg., for certain tests within the chamber, or especially in order to permit only certain wavelengths to pass through the window, the plate borne by the cell system can be made from optical quartz glass with a filter layer which selectively absorbs the undesired wavelengths or passes the desired wavelengths. It is particularly desirable to produce these filter layers in a conventional manner by the vacuum deposition of vapors of appropriate metals or metal compounds.

It is not essential to use quartz glass for the supporting grid; instead, it could be made of the less expensive fused silica, so that the entire system is made considerably less expensive.

Even though a higher absorption is present in the ultraviolet and infrared range due to great thickness of the supporting framework, of 50 to 80 mm, for example, the rest of the spectrum can nevertheless pas unimpeded through the ribs as well. For example, the total clear area in the case of different-sized holes as in FIG. 3, with diameters of 80 and 32 mm, amounts to a total of 80 percent of the entire area, and only 20 percent of the light passes through the remaining rib structure. Therefore, if transparent material even of low transmittance should be used for the supporting grid, it can be said that a total of at least 90 percent of the ultraviolet and infrared radiation received passes through the entire system. A cellular structure with the largest possible holes should be striven for, because this will, of course, minimize the scattering due to the cell wall. Therefore, holes as much above 80 mm diameter as possible are desirable.

When parallel light is directed through the window, the supporting grid will, of course, produce a shadow effect. This can be minimized by using reflectors or lenses of short focal length to make the light enter at a relatively large angle. This light entering the chamber will emerge behind the window diffusely. To intensify this effect, the walls of the perforations can be provided with a reflective metallic coating.

Another advantage of the optical window according to the invention consists in that the percentage of the high-quality quartz glass amounts to only 8 to 10 percent of the total quartz glass weight required for a massive plate. This is an extraordinary saving and a gain in transmitted intensity in the ultraviolet and infrared range of the radiation.

Needless to say, the structure of the optical device of this invention can also be modified in other ways, as for example, by creating openings of hexagonal or rectangular cross-sections, adapting the opening sizes and rib thicknesses to the mechanical conditions involved. What is to be sought for is a maximum width of the opening, with a view toward a minimal thickness in the fused-on quartz glass plate. For example, a clear opening between the parallel sides of a hexagon of about 70 mm in the cellular system. Such openings still permit, for static reasons, the fusing on of a plate with a thickness of as little as 4 mm. Circumstances are mush the same in the case of square openings or openings in a polygonal arrangement.

Another considerable advantage of the optical window according to the invention is its low weight. Its weight corresponds to as little as a fourth and less of the weight of a corresponding massive window.

The support member can be produced both by drilling from the solid plate and by blasting out with a sand blasting machine, or also by ultrasonic boring. A material-saving process of manufacture, however, is direct hot-forming, hot-sintering and fusing of the support grid. Another possibility of manufacture consists in the welding or fusing together of the individual ribs, especially in the case of a cell system with square and rectangular openings.

The optical window according to the invention combines in itself, by and large, the advantages of low-weight, high elasticity, and particularly its very high transmittance even when quartz glass types of low quality are used, as for example, those having a higher infrared absorption general, combined with excellent ultraviolet transmittance.

The use of a window of this kind is of interest not only in the case of chambers for the simulation of conditions in outer space, but also in the case of tanks and chambers in general in which the windows are subjected to only slight pressure differences, or even in tanks in which practically no pressure difference prevails between the inside and the outside, but in which large openings must be combined with a wall thickness amounting to at least 20 mm, for reasons of stability alone.

As used herein, the term "optical glass" is intended to signify substantially any type of glass used for optical purposes, that is, for use in reflection, refraction, transmittance, diffusion or focusing.

In addition to the mirror and window embodiments set forth above, it is also within the scope of this invention to utilize the described construction as a lense or condenser system with appropriately shaped optical glass plate having an appropriate composition.

I claim:

1. A lightweight optical assembly comprising an optically transparent plate, which plate is supported by and fused to a fused silica perforated support structure, which support structure comprises walls extending perpendicular to the major surfaces of said plate wherein said plate is fused to said walls at the interface of the ends of said walls and the rear surface of said plate and wherein the rear side of said plate extends convexly in lens form into the perforations of said supporting structure between the walls thereof, said supporting structure having perforations of a diameter between 40 and 80 mm, substantially uniformly distributed throughout its area, all of said perforations generally extending axially parallel to one another, and there being perforations having a diameter at both ends of said range and at a number of intermediate values with at least some of the perforations having smaller diameter being at the outer peripheral edge of said supporting structure, the walls between said perforations being between 2 and 6.0 mm in thickness.

2. An optical assembly according to claim 1, wherein the small perforations are substantially uniformly distributed throughout the area of the supporting structure and the diameter of the large and small perforations and the wall thicknesses therebetween have a relationship as set forth in the following table:

|     | Diameter of the large perforation in mm | Diameter of the small perforation in mm | Smallest remaining wall thickness in mm | Greatest wall thickness in mm |
| --- | --- | --- | --- | --- |
| I   | 40 | 15    | 2.5     | 4.0 |
| II  | 50 | 15–20 | 3.0     | 4.0 |
| III | 60 | 15–22 | 3.0–3.5 | 4.5–5.0 |
| IV  | 70 | 20–25 | 3.5–4.0 | 5.0 |
| V   | 80 | 22.28 | 4.0–4.5 | 6.0 |

3. An optical assembly as claimed in claim 1, wherein said optical plate is quartz glass.

4. An optical assembly as claimed in claim 1, having a back plate fused to said support structure at the interface between said back plate and the ends of the walls of said support structure opposite the ends thereof fused to said transparent plate, said back plate having apertures therein communicating with said perforations.

5. An optical assembly as claimed in claim 4, wherein said back plate extends convexly into the perforations of said supporting structure between the walls thereof.

6. A lightweight optical mirror or window assembly comprising an optically transparent plate, which plate is supported by and fused to a fused silica perforated support structure, which support structure comprises walls extending perpendicular to the major surfaces of said plate wherein said plate is fused to said walls at the interface of the ends of said walls and the rear surface of said plate and wherein the rear side of said plate extends convexly in lens form into the perforations of said supporting structure between the walls thereof, said support structure having perforations of a diameter between 40 and 80 mm, substantially uniformly distributed throughout its area, all extending generally axially parallel to each other, and wherein said perforations comprise large and small perforations with the diameter of the large and small perforations and the wall thicknesses therebetween, having a relationship as set forth in the following table:

|   | Diameter of the large perforation in mm | Diameter of the small perforation in mm | Smallest remaining wall thickness in mm | Greatest wall thickness in mm |
|---|---|---|---|---|
| I | 40 | 15 | 2.5 | 4.0 |
| II | 50 | 15–20 | 3.0 | 4.0 |
| III | 60 | 15–22 | 3.0–3.5 | 4.5–5.0 |
| IV | 70 | 20–25 | 3.5–4.0 | 5.0 |
| V | 80 | 22–28 | 4.0–4.5 | 6.0 |

* * * * *

UNITED STATES PATENT OFFICE
CERTIFICATE OF CORRECTION

Patent No. 3754812  Dated August 28, 1973

Inventor(s) Heinrich Mohn

It is certified that error appears in the above-identified patent and that said Letters Patent are hereby corrected as shown below:

On the page preceding the specification, at [73], the assignee's name should read -- Heraeus-Schott Quarzschmelze --; insert -- [30] Foreign Application Priority Data
May 21, 1965 Germany H 56 105 IXa/42h
Sept. 23, 1965 Germany H 57 249 IXa/42h --.
Column 7, line 37, change "descrease" to -- decrease --;
line 45, after "edge" delete "of";
line 50, change "b$^2$" to -- h$^2$ -- in the formula.
Column 8, line 61, after "10" change "shoud" to -- should --.
Column 11, line 47, change "mush" to -- much --.

Signed and sealed this 16th day of April 1974.

(SEAL)
Attest:

EDWARD M. FLETCHER, JR.
Attesting Officer

C. MARSHALL DANN
Commissioner of Patents